G. CROMPTON & H. WYMAN.
Loom.

No. 230,243. Patented July 20, 1880.

Witnesses.
L. F. Connor.
Jos. P. Livermore

Inventors.
George Crompton and
Horace Wyman,
by Crosby & Gregory, Attys

G. CROMPTON & H. WYMAN.
Loom.

No. 230,243. Patented July 20, 1880.

Fig. 3

Witnesses.
L. F. Connor
Jos. P. Livermore

Inventors.
George Crompton and
Horace Wyman,
by Crosby & Gregory, Attys

G. CROMPTON & H. WYMAN.
Loom.

No. 230,243. Patented July 20, 1880.

Fig: 4.

Witnesses
L. F. Connor.
Jos. P. Livermore.

Inventors.
George Crompton
Horace Wyman.
by Crosby Gregory, Attys

G. CROMPTON & H. WYMAN.
Loom.

No. 230,243.  Patented July 20, 1880.

Witnesses.
L. F. Connor.
Jos. P. Livermore.

Inventors.
George Crompton and
Horace Wyman.
by Crosby & Gregory Attys

G. CROMPTON & H. WYMAN.
Loom.

No. 230,243. Patented July 20, 1880.

Witnesses.
L. F. Connor.
Jos. P. Livermore.

Inventors.
George Crompton,
Horace Wyman,
by Crosby & Gregory Attys

G. CROMPTON & H. WYMAN.
Loom.

No. 230,243.  Patented July 20, 1880.

Witnesses.
L. F. Connor.
Jos. P. Livermore.

Inventors.
George Crompton
Horace Wyman,
by Crosby & Gregory Attys

G. CROMPTON & H. WYMAN.
Loom.

No. 230,243. Patented July 20, 1880.

Witnesses.
L. F. Connor.
Jos. P. Livermore.

Inventors.
George Crompton and
Horace Wyman.
by Crosby & Gregory Attys

United States Patent Office.

GEORGE CROMPTON AND HORACE WYMAN, OF WORCESTER, MASSACHUSETTS, ASSIGNORS TO SAID CROMPTON.

LOOM.

SPECIFICATION forming part of Letters Patent No. 230,243, dated July 20, 1880.

Application filed November 21, 1879.

*To all whom it may concern:*

Be it known that we, GEO. CROMPTON and HORACE WYMAN, of the city and county of Worcester, and State of Massachusetts, have invented an Improvement in Looms, of which the following description, in connection with the accompanying drawings, is a specification.

This invention relates to improvements in looms for weaving worsted and woolen goods for clothing and similar purposes, and has for its objects improvements in mechanism for operating drop shuttle-boxes, and an improved method of operating the lay with relation to the formation of the shed for the reception of the weft, whereby the weft beaten in by the reed is packed closely between and held by the warps while the succeeding shed is nearly completed.

In this invention the shuttle-boxes are operated by well-known long gears, which, at the proper time, are made to engage and actuate toothed cranks placed between them, the said toothed cranks having connecting-rods to move levers which shall be instrumental in actuating the shuttle-boxes; but in this present invention each of the said toothed cranks is carried by a shifting-lever having its end reversely inclined at its edges, so that it may be acted upon at one or the other edge before each change of shuttle-boxes by a selecting device, preferably made as a reciprocating wedge or incline, the said selector being under the control of the pattern-surface for the shuttle-boxes, whereby each shifting-lever for each toothed crank is moved positively when being thrown into engagement with the long gear which is to actuate it, to thereby impart to the connecting-rod of the said toothed crank such movement as will vibrate one of the shuttle-box-moving levers; but the force with which the teeth of the toothed cranks and toothed gear which actuate them are held together depends upon the stress of a strong spring, to thereby provide against breaking parts by overstrain.

In this present invention the primary and secondary levers for each series of shuttle-boxes are shown so located as to be turned about the same center of motion, and, by means of sheaves carried by the said shuttle-box levers and chains, or equivalents thereon, extended over other sheaves on a fixed stud, two of the said levers are, by their changes of position, enabled to place opposite the lay any one of a series of four shuttle-boxes.

The loom herein described is supposed to be one of that class known as the "close shed," and the shed-forming devices are, and may be, in construction and operation the same as in the well-known Crompton looms for weaving woolen goods.

In carpet-looms for weaving pile fabrics, wherein the woolen yarns for the face of the carpet are formed into loops over pile-wires and are connected with a linen or jute backing practically devoid of that elasticity possessed by worsted or woolen yarn, it has been customary to cause the lay to beat in the pile-wire and filling in alternate sheds with two blows, the dents of the reed after once striking the said filling receding from contact with it, and then being again moved forward to strike the filling its second blow; but in such looms the succeeding shed is not formed at the time the reed retires from its first blow, and the filling is apt to fall back.

In many classes of worsted and woolen goods of single thickness, such as used for clothing purposes, it is desired by the weaving operation to make the fabric so that it will have the greatest possible solidity and firmness consistent with the warp and weft used.

The weft in fabrics woven in ordinary woolen looms, if beaten up very closely by the dents of the reed carried by the lay, it striking a single blow, is liable to be strained and broken; but by distributing this force, striking the weft less hard at first and thereafter holding or packing it closely into and between the warps while the subsequent shed is nearly formed, (the dents of the reed during the principal portion of the time occupied by the shedding devices to form the subsequent shed not retiring from contact with the weft then beat in by it,) we have discovered that the fabric may be made much more dense and compact without injuriously straining the warp, which compactness greatly improves the quality of the fabric and renders it possible to produce on fancy looms, especially of "close-shed" variety, better goods, both as to weight and firmness, and with fewer broken threads in the warp, than are formed in goods of lighter weight and less firmness, such as now made upon ordinary forms of fancy-looms, and this also with less strain upon the mechanism of the loom.

The dents of the reed in this improved method of weaving, to produce most compact fabrics, strike the weft as the shed is closed, and the said dents remain in contact therewith during the time that the take-up mechanism of the loom (which may be of any usual construction) operates to take up the slack in the cloth made by that blow of the reed, and the reed remains in contact with the said weft while the next shed to receive the next shot of filling is almost formed, or is sufficiently sprung to receive the shuttle.

In practice, after the first beat up of the reed and lay, the latter, instead of standing perfectly still, or dwelling, is retracted for about three-sixteenths of an inch, but without retiring from contact with the said weft. During this very small retrograde motion of the reed and lay the harness-frames act to form the next shed, and by their operation on the warps, the tension of which is retained to substantially the degree to which they were subjected when the reed and lay were most forward, the cloth is stretched or drawn backward so as to maintain the weft-thread in the closed shed and the dents of the reed in firm contact, to thereby permit the said dents to act upon and pack into and keep pressed into the space inclosed by the then crossed warps, the weft last laid absolutely preventing the weft from slipping backward away from the weft previously laid and bound into the cloth ahead of it.

In this improved plan of weaving the reed and lay remain forward in contact with the weft for substantially one-third the revolution of the crank-shaft, at which time the shuttle-boxes are raised or permitted to fall.

In practice it has been found that a fabric made on the ordinary close-shed loom with a certain warp and weft beat in as closely as practicable without breaking the warps, and so as to contain, say, eighty picks to the inch, may by this our improved loom, with the same warp and weft, be made to contain one hundred and four picks to the inch.

This compact method of weaving is especially advantageous in the production of worsted goods, for such goods, in the finishing operation subsequent to leaving the loom, are washed as little as possible, and are not nor can they be fulled to the extent possible with woolen goods.

Making the cloth more compact and firmer by weaving enables it to stand more strain without stretching, and also decreases its tendency to shrink when wet.

Figure 1 is a right-end elevation of a loom provided with parts of our invention, the said figure showing only the parts outside the loom-frame; Fig. 1$^A$, a modified detail of that figure; Fig. 6, a rear view of Fig. 5. Fig. 12, a detail showing the connection between the crank-shaft and one of the lay connecting and moving links; Figs. 13 to 19, inclusive, in full and dotted lines, show, in diagram, different positions in which the shuttle-box levers may be placed by the toothed cranks to bring either of the shuttle-cells of either of the two series of four shuttle-boxes at opposite ends of the loom into position opposite the race of the lay. The side views in the said figures indicate that the row of sheaves on the stud $m^3$ are of different sizes; but such is not the case, and the said figures are so drawn merely to illustrate that there are four sheaves in line, and being all of one size they could not be seen in a side view except so portrayed. Fig. 20, a modification of the shuttle-box mechanism, showing a selector of different shape and a pattern-chain; Fig. 21, a detail showing the eccentric and strap which moves the shedding mechanism and the guide to direct the movement of the eccentric. Fig. 22 is a cross-section of the jaws between which the ends of the selectors and shifting-levers rest; Fig. 23, a modification to be referred to. Figs. 24 to 29, inclusive, are diagrams showing different positions of the warp, harness-frames, and lay during the time the weft is beat up and packed in, as hereinafter described.

The frame-work $a$ of the loom is of suitable shape to properly support the working parts.

Figures 1, 1A:
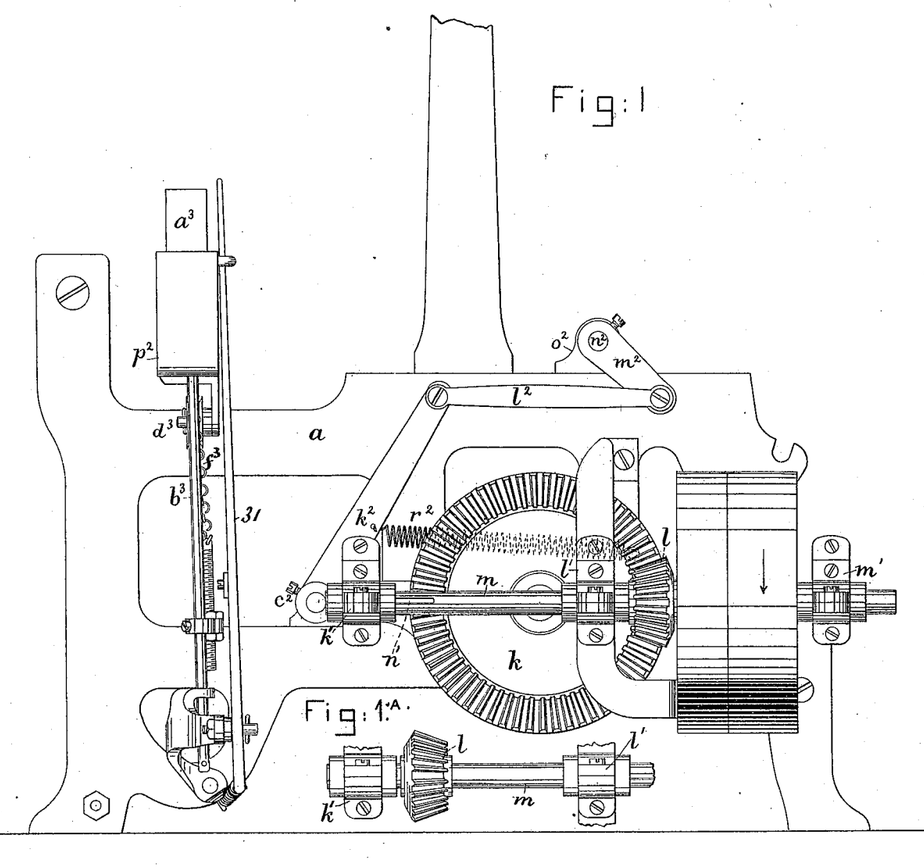

The crank-shaft $b$, herein placed low down in the frame, and provided with cranks $c$ to actuate the lay, picking-arms $d$, and bowls $e$, eccentric $f$ to impart movement to the elevator and depressor rock-shaft $g$ through eccentric-strap $h$, and link $i$ and pinion $j$ to drive the shuttle-box-actuating mechanism, has upon its right-hand end a bevel-toothed gear, $k$, which is engaged by bevel-pinion $l$ on the power-shaft $m$, having upon it the usual fast and loose pulleys, that, in practice, will receive a belt which will be under the control of belt-shipping devices, such as are common in the Crompton loom. This shaft $m$ is entirely supported in bearings $k'$ $l'$ $m'$ upon the loom-frame, and, as herein shown, the fast and loose pulleys are located between the two bearings $l'$ $m'$, and this end of the shaft is prolonged across the face of gear $k$ and rests in bearings $k'$, and the bevel-pinion $l$ is so placed upon the said shaft that the top of the fast pulley in operation turns upward from the loom-frame.

It is a desideratum to drive all the looms in a room by open rather than by crossed belts; and to be able to do this the shaft $m$ is provided with an extra key-seat, $n'$, near the bearing $k'$, in order that all the looms at one side of the room may have their bevel-pinions $l$ changed from the position shown in Fig. 1, so as to occupy a position on the said shaft $m$ next the bearing $k'$, as in Fig. 1$^\text{A}$, under Fig. 1.

The harness-frames $n$ (two only shown) are connected by straps and cording in the usual way with the notched upright levers $o$, pivoted at $p$, each upright lever having attached to its projection 2 a jack, $r$, having hooks at 3 4 to be engaged by the usual elevator $s$ or depressor $t$, which, as herein shown, are arranged to be reciprocated in curved guiding-slots 5 6 in the extension $a'$ of the frame-work $a$, said guideways forming parts of arcs of circles having their centers at the centers $p$ of the levers $o$.

The elevator and depressor have their ends rounded to form ball-like terminations, which are embraced by the concaved ends 7 and attached caps 7$^\times$ of the connecting-rods $u$ or $v$, which are shown as adjustably attached to the arms $w$ $w^\times$, extended above and below the shaft $g$ for different distances, the adjustment of the said rods $u$ and $v$ thereon enabling the acting edges of the elevator and depressor to occupy angular positions with relation to each other when the shed is open, to thereby elevate or depress the back harness-frames more than those at the front, and then subsequently to even all the harness-frames when the elevator and depressor are again brought into parallel position.

By inclining the elevator and depressor out of parallel line, as described, when the shed is opened, it is possible to shorten the upper ends of the upright levers above the hooked jacks, thereby permitting the connection of the harness-cording with the said levers nearer in line with the points at which the elevator and depressor draw upon the levers or jacks.

By inclining the edges of the elevator and depressor, as described, to open the shed, and notching the ends of the upright levers, as shown, it is possible to insure with the greatest accuracy any exact adjustment vertically of any particular harness-frame of the series.

This adjustment of the cording on the notched ends of the levers is of great utility, and will frequently be made available, especially in fancy-looms, for it is not infrequent that a pattern of cloth being woven will cause greater strain on some one or more harness-frames than on others, which so taxes the lever and cording of the said frame or frames that the cording has to be adjusted independently on the levers to have all the warps lifted by the harness-frames or depressed so as to occupy the proper planes in the shed.

The arm $x$ of shaft $g$ is connected with link $i$, which is attached to the strap $h$ that embraces the eccentric $f$, the latter being that device which imparts motion to the harness-frames $n$.

The roller $o'$, located at the pivotal point of the eccentric-strap $h$ and link $i$, works in a guiding-groove, $p'$, in a bracket, $r'$, attached to the side of the loom. This roll, by its action on or in the guideway $r'$, (see Fig. 21,) insures a right-line movement for the link $i$, and also permits the eccentric-strap $h$ to move about the pin 2$^\times$, connecting it with the said link during the time the shed is opened for the passage of the shuttle.

It is obvious that a crank with a short connecting-rod, $i^6$, having a pin to enter the said guideway, might be used instead of the eccentric, as in Fig. 23.

The shed-forming pattern-surface $b'$, of any usual construction, is placed upon a shaft, $c'$, having a bevel-gear, $d'$, engaged by a bevel-gear, $f'$, on the shaft $g'$, upon which is placed the pattern-surface $h'$, of any usual construction, which controls the selection of the shuttle-boxes, these two shafts being so geared together as to rotate in unison.

Figure 4:
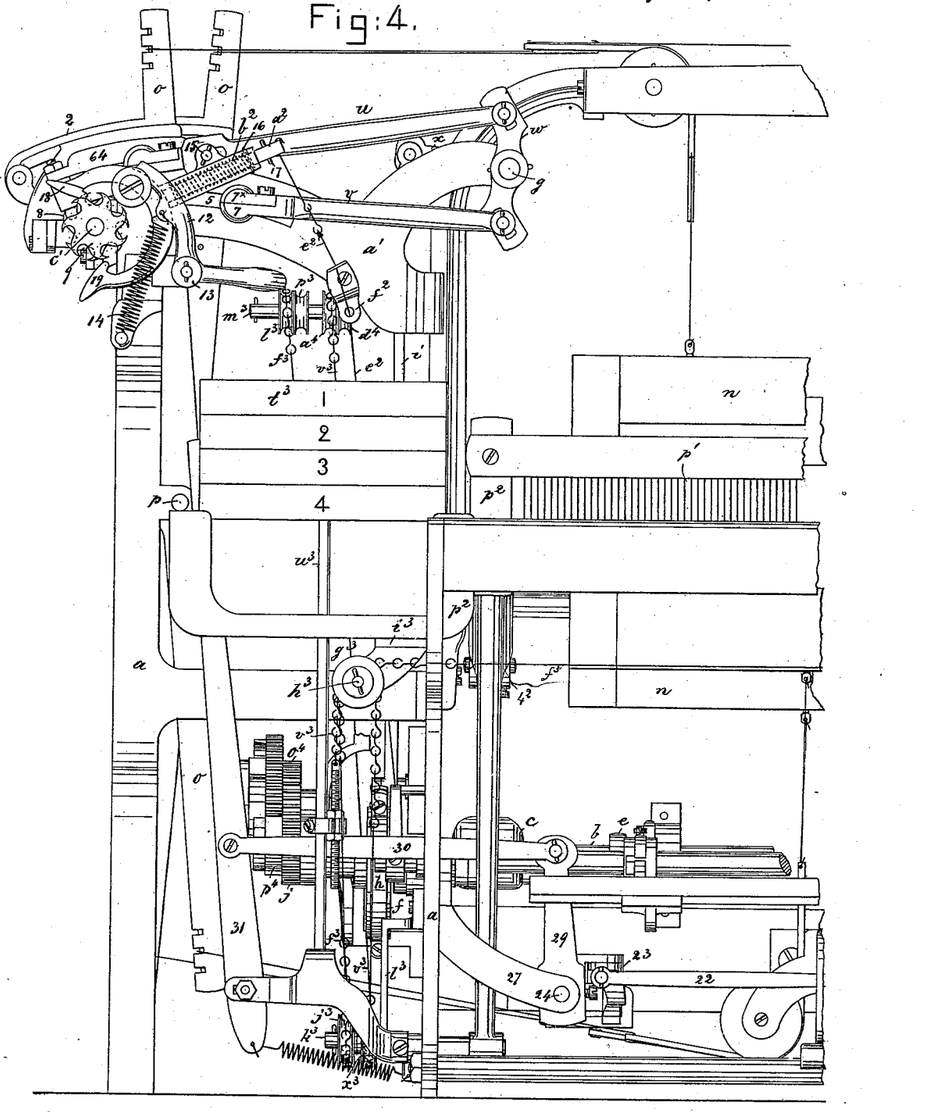
Fig. 4, a view of the left-hand part of the loom at front, the chief part of the box-operating mechanism being left off, as it is shown in other figures.

At one end of the shaft $c'$ are two ratchet-wheels, 8 9, having teeth pointing in opposite directions; and outside of the said ratchet-wheels is the usual check-wheel 10, with which co-operates the roller on the hand-lever 12, pivoted at 13, and held down by the spring 14, the said roller of the lever 12 holding the shaft $c'$ at rest when not positively actuated. This stop-wheel is omitted from Fig. 4, to more clearly show the ratchet-wheels, and in the said figure the ratchet-wheel 8 is shown at the rear of the one 9.

The pattern-cylinder $b'$ derives its step-by-step movement in the forward direction for regular weaving, or in backward direction when finding a miss-pick, through the double-hooked pawl, the shank $a^2$ of which is arranged in a sleeve, $b^2$, pivoted at 15, near the end of the connecting-rod $u$, which actuates the elevator.

A spring within the said sleeve, (see Fig. 4, in dotted lines,) pressing on a pin, 16, of the shank $a^2$, keeps the pawl held back in the case, and the pin 17 governs the forward reciprocation of the shank $a^2$ in the said sleeve. This spring in the backward motion of the pawl is first compressed, and after the ratchet is started and the pawl comes to rest the spring, by its expansion, completes the motion of the ratchet.

The hooks 18 19 of the said double pawl face each other and partially embrace the ratchets 8 9, so that when the said sleeve is turned on its pivot the hook 18 will either engage the ratchet 9, or the hook 19 the ratchet 8, the former hook turning the pattern-surfaces forward, while the latter hook turns them backward.

At the lower part of the loom and in front of the crank-shaft is a shaft, $c^2$, having an arm, $d^2$, with which is connected a cord or wire, $e^2$, which is attached at its other end to the end of the shank $a^2$ of the double-hooked pawl. This cord $e^2$ is extended through suitable guides $f^2$, so that when the said shaft $c^2$ is turned in the direction that it will be turned by depressing the arms $g^{10}$, having upon them a foot-board, $g^2$, the said pawl-sleeve will have its inner end depressed to engage the hook 19 with the ratchet 8. This arm $g^{10}$ will be depressed by the operator whenever it is desired to find a misspick, and during this time the elevator and depressor will operate the hooked jacks, levers, and harness-frames to form sheds; but the shuttle will not be thrown, for the arm $h^2$ (shown most clearly in Figs. 2 and 3) will, by the depression of the arms $g^{10}$, be moved from the full-line position, Fig. 2, to its dotted-line position, and acting upon one end of lever $i^2$, pivoted at 20 and connected by links 21 22 with the auxiliary picking-levers 23, pivoted to the picker rock-shafts 24 at 25, will throw the said auxiliary levers 23 from their full-line position, Fig. 3, to their dotted-line position, so that the picking-bowls $e$ will not strike the curved portions 26 of the auxiliary picking-levers 23 and the shuttles will not be thrown.

The picker rock-shaft 24, supported in suitable bearings 27 28, has near its forward end an arm, 29, connected by link 30 with the picker-staff 31, of usual construction. At the end of this same shaft $c^2$, at the right-hand end of the loom, is an arm, $k^2$, connected by link $l^2$ with an arm, $m^2$, on a shaft, $n^2$, supported in bearings $o^2$. This shaft $n^2$ has arms 32, at the ends of which are roller-carrying pins 33, that enter slots in slotted lay-controlling arms 34, pivoted at 35 upon the stands 36. These arms 34 have jointed to them the rear parts, 37, of the jointed lay-controlling links, the fore parts, 38, of which links are connected with the lay $p^2$ at 39, and with part 37 at 40.

Figures 2, 30:
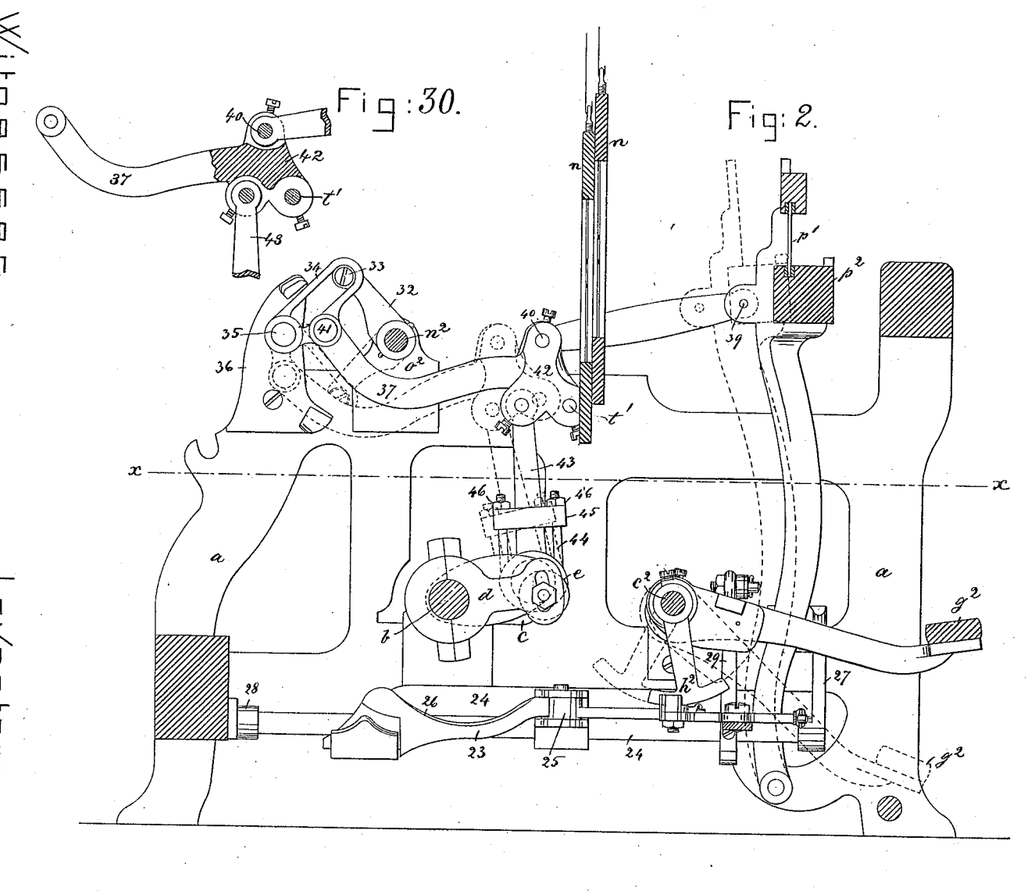
Fig. 2, a vertical section taken through the loom, from front to rear side, at the right of its center, and looking toward the right-hand end of the loom.
Fig. 30 is a partly-sectional detail, showing the mode of connecting the lay-actuating links and the pitman.
Figure 3:
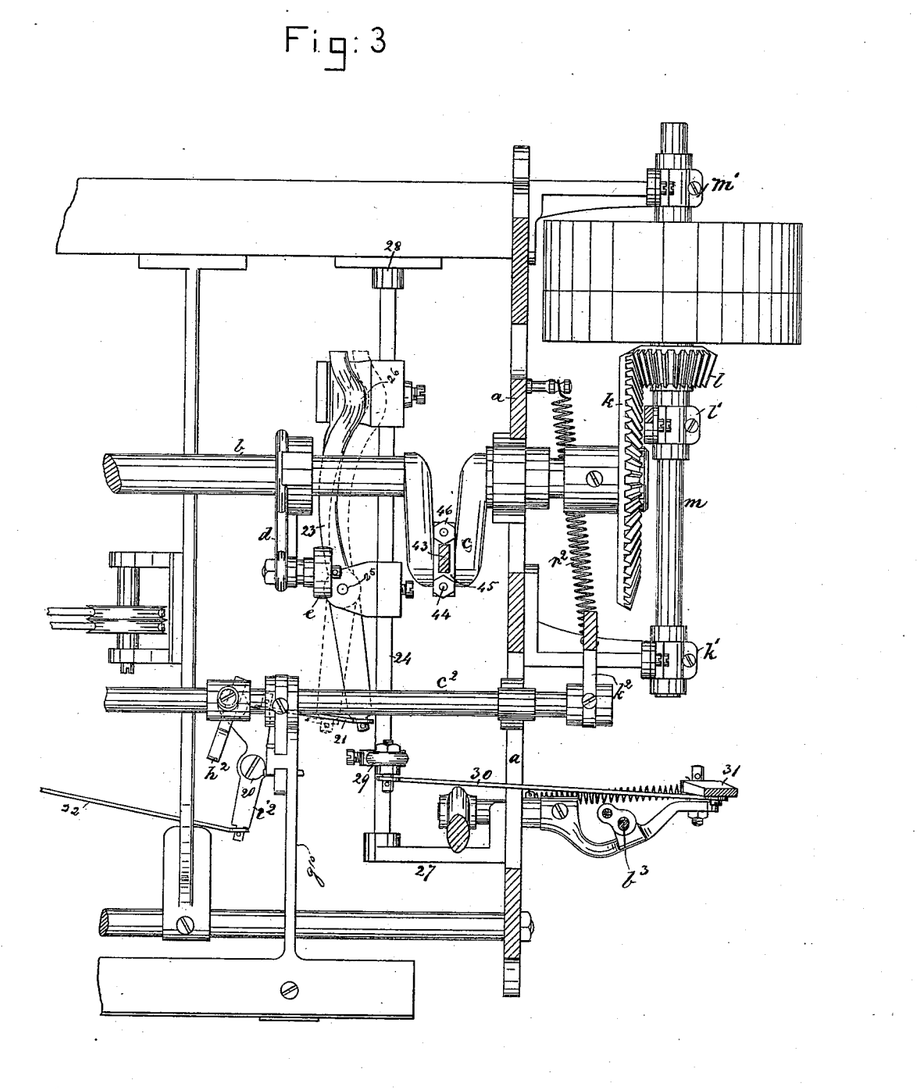
Fig. 3, a section of Fig. 2 on the line $x x$.

The arm $k^2$ has connected with it one end of a spring, $r^2$, which so operates the shaft $c^2$ as to hold the arms $g^{10}$ elevated, at which time the parts are as in full lines, Figs. 2 and 3.

When the foot-board $g^2$ is depressed the arms 32 and roller-studs 33 throw down the slotted arms 34, thereby so changing the positions of the pins 41 that the crank-shaft $b$ in its rotation will reduce the forward throw or movement of the lay so that it will stop before the dents of the usual reed $p'$ strikes the weft, and consequently when the foot-board $g^2$ is depressed and the arms 34 thrown down, as in dotted lines, Fig. 2, the weft will not be beaten up. This enables the misplaced weft to be readily picked out when the shed containing it has been found and reopened by operating the shed-forming devices.

If desired, the pin 41 may be fixed to the loom side, when the reed would strike the weft as usual.

The rear parts, 37, of the lay-connecting links have enlarged heads 42, (shown fully in side view, Fig. 2,) which are connected by links 43 (see Fig. 12) with the cranks $c$ of the crank-shaft, a yoke, 44, extending about the crank-shaft being adjustably held upon a cross-bar, 45, of link 43 by means of nuts 46, adjustment of the said yoke 44 keeping the parts of the link 43 which surround the crank-shaft properly in contact therewith and compensating for wear. This is shown in detail in Fig. 24.

In order that the lay and reed may remain in contact with each weft beat in as and during the length of time hereinbefore stated, we have so arranged and joined the lay-connecting links (herein shown as composed of the rear parts 37, having heads 42 and the parts 38 and 43) with relation to the crank-shaft and lay that when the lay is in its most forward position the centers of the pins 39, 40, and 41 will be in a straight line; and to enable the dents of the reed to remain in contact with the weft for the length of time stated, or while the next shed is being formed and crossed, or substantially so, as shown in diagrams, Figs. 24 to 29, the crank-shaft is made to raise the center pin 40 to its highest position, or to a point above a straight line connecting the points 39 41, when the pin 40 is again, by the further rotation of the crank-shaft, brought into the straight-line position just referred to, the time occupied by the said pin 40 in moving from a position just below its position in line with centers 39 41, where the reed first touched the weft, until it rises above and again descends to and just below the said line, to remove the dents of the reed from contact with the weft, being substantially one-third of the time occupied by the crank-shaft in making one revolution.

All the movements of the lay must be steady and positive and without the intervention of springs of any sort, in order to secure the best result in weaving and insure high speed, and the lay-connecting rods are therefore pivoted directly upon the swords near the raceway of the lay.

The diagram Fig. 24 shows the position of the harness-frames, shed and reed, and lay when the shuttle, after having been thrown, reaches the opposite box; Fig. 25, the position of the same parts when the reed first touches the weft; Fig. 26, when the lay and reed reach their most forward position; Fig. 27, the position when the lay and reed have been moved back for about three-sixteenths or one-fourth of an inch, but without the dents of the reed breaking contact with the weft; Fig. 28, the position of the parts when the lay and reed are again at their most forward throw, the shed being considerably formed; and Fig. 29, the position of the parts just as the dents of the reed are to break contact with the weft, in which diagram it will be noticed that the new shed is almost completed.

The line of warp 90, uppermost in Fig. 24, is in Fig. 29 the lowest.

The breast-beam is marked 93 and the woven cloth 94.

Keeping the dents of the reed and lay forward against the cloth for a longer period than usual in fancy-looms, for the purposes and as herein described, is also made very advantageous in shifting the shuttle-boxes carried by the lay, for the boxes are changed during that time, and, being moved the greatest part of their distance while the lay stands still, or nearly so, are moved with the least expenditure of power and with least friction, and when their movement is that produced by their own weight it is obvious that they will move quicker and more surely the nearer the box-rod is in a vertical line.

The pattern-surfaces are moved while the shed is being closed and while the selectors hold the toothed cranks in engagement with their actuating-gear, the shuttle-boxes being then shifted, and as soon as the shed is formed the selectors are lifted to be again distributed by the stationary pattern-surface.

If it is desired to produce goods of less compact nature than that herein referred to, the link 43 may be connected with the head 42 by a pin at $t'$, when the reed will remain in contact with the cloth for a less time during each rotation of the crank-shaft, as in ordinary woolen-looms.

The drawings show four drop shuttle-boxes at each end of the loom.

The series of shuttle-boxes $a^3$ at the right-hand end of the loom is supported by a rod, $b^3$, guided in the usual manner, and has connected with it a chain or equivalent, $f^3$, which passes over sheaves $d^3$ at the under side of the lay $p^2$ at its right-hand end, thence over the forward sheave, $g^3$, of a pair of sheaves placed on a stud, $h^3$, of a bracket, $i^3$, attached to the lay $p^2$ at its left-hand end, when the said chain is extended downward and about a sheave, $j^3$, mounted on a stud, $k^3$, of a bracket attached to the side of the loom-frame; thence the chain $f^3$ is extended (see Fig. 5) diagonally upward over a sheave, $l^3$, on a stud, $m^3$, thence down over the said sheave under and about a sheave, $m^3$, on the secondary shuttle-box lever $n^3$, having its pivot on the fixed stud $o^3$, and from thence the said chain is passed upward about a sheave, $p^3$, on the same stud $m^3$, and down about the said sheave, when it is connected, as herein shown, by a link, $r^3$, with the main shuttle-box lever $s^3$ at the rear of the secondary lever $n^3$, having its fulcrum also on the stud $o^3$, the said levers $n^3$ $s^3$, by their change of position about the same center, as hereinafter described, through the said chain $f^3$ or equivalent connecting device, controlling the positions of the tier of shuttle-boxes $a^3$ at the right-hand side of the loom.

The series of shuttle-boxes $t^3$ at the left-hand end of the loom (see Fig. 4) is mounted upon a shuttle-box rod, $u^3$, adjustably connected by means of a chain, $v^3$, which is passed up over and about a sheave, $w^3$, (see Fig. 5,) on the stud $h^3$, before referred to, thence down about the sheave $x^3$ (see Fig. 4) on the stud $k^3$, before referred to, thence up diagonally across the end of the loom-frame at the rear of the chain $f^3$, and over a sheave, $a^4$, on the stud $m^3$, thence downward and about a sheave, $b^4$, on the secondary lever $c^4$, pivoted upon the stud $o^3$, thence upward over a sheave, $d^4$, on the stud $m^3$, and downward, when it is connected, as herein shown, by a link, $e^4$, with the primary lever $f^4$, also having its fulcrum on the stud $o^3$, the said levers $c^4$ $f^4$, through the chain or equivalent $v^3$, controlling, by their change of position, the tier of shuttle-boxes $t^3$.

The shuttle-box-actuating devices and the studs $o^3$ $m^3$ for the sheaves and levers mounted thereon are contained upon an independent frame-piece, $g^4$. This frame-work has studs $h^4$ $i^4$, upon which are placed toothed gears $j^4$ $k^4$, having attached toothed wheels $l^4$ $m^4$, which mesh together, the toothed wheel $m^4$ having imparted to it intermitting motion to the extent, as herein shown, of half a revolution by the gear $n^4$, having at its periphery two sectors of teeth separated by blank spaces. This gear $n^4$ has at the rear of and attached to it a gear, $o^4$, which is engaged and rotated by the gear $j$ on the crank-shaft $b$, before referred to.

The toothed wheel $n^4$, opposite the two points where its teeth are omitted, is provided with two arcal flanges, $p^4$, extended laterally therefrom.

The long gear $k^4$, loose on its holding-stud, has fixed to it a holder, $r^4$, having a convexed face. So long as the toothed portions of wheel $n$ and gear $k^4$ are in contact the said gear will be rotated; but just as the last tooth of each of the two series of teeth of wheel $n$ leaves the teeth of gear $k^4$ the convexed face of the holder $r^4$ is moved in position to fit the convexed face of one of the flanges $p^4$, thereby preventing the further rotation of the long gear $k^4$ until the flanged part $p^4$ passes beyond the holder $r^4$, when a tooth of the wheel $n$ will immediately engage with and again rotate the long gear $k^4$. Consequently so long as the holder $r^4$ and one of the said flanges are in contact the long gears $k^4$ $j^4$ will be held at rest.

At the front of and adjustably connected with the gear $n^4$ is a cam-plate, $s^4$, having a cam-groove, $t^4$, so shaped as to receive and act upon a roll or pin of a connecting-rod, $u^4$, and move it upward and downward twice during each rotation of the shaft $b$.

By adjusting the cam $s^4$ upon the toothed gear $n^4$ the time of moving the connecting-rod $u^4$ may be accurately controlled.

Figure 5:
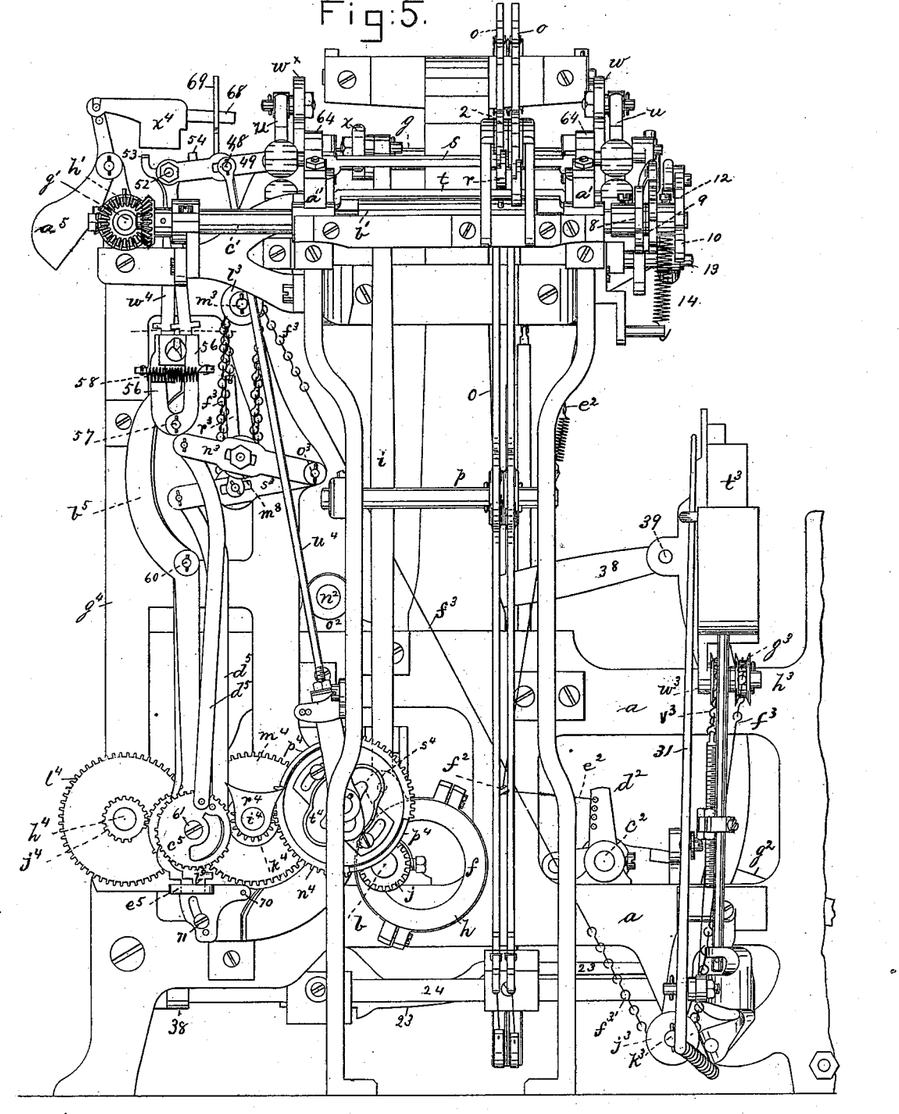
Fig. 5, a view of the left-hand end of the loom.
Figure 7:
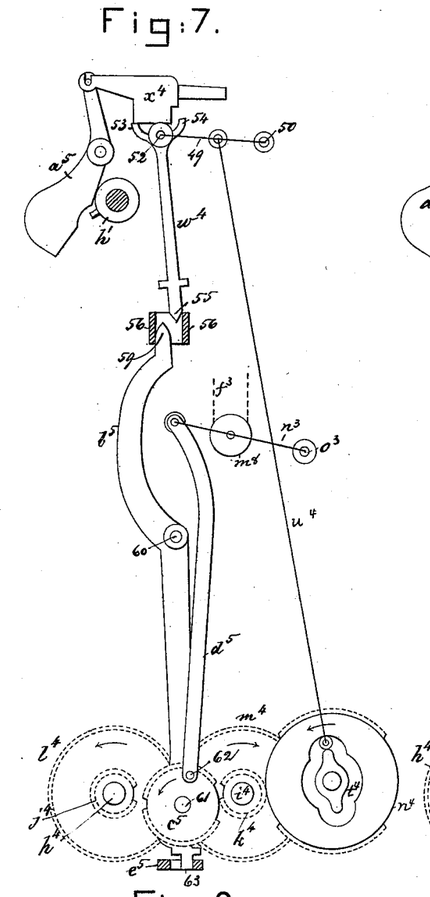
Fig. 7 represents one of the vibrating shifting-levers for moving the toothed crank into and out of engagement with its actuating-gears, and the selector, wedge-shaped or inclined, to move it, and the connecting-rod between it and one of the shuttle-box levers for imparting movement to the shuttle-boxes.
Figure 8:
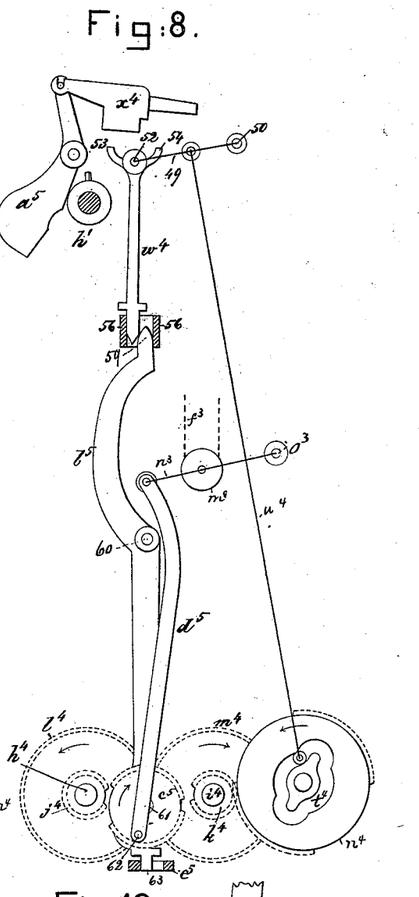
Fig. 8, a diagram showing the same devices in a different position.
Figure 9:
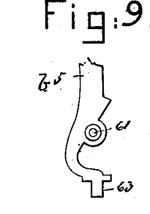
Fig. 9, a detail of the lower end of the shifting-lever and its pivoted guide and stop.

The upper end of the connecting-rod is attached at 48 with an arm, 49, pivoted at 50, (see Figs. 7 and 8,) the said arm 49 having at its outer end a long pin, 52, upon which are hung a series of selectors, shown as reciprocating wedges $w^4$, having toes 53 54, to be acted upon by the selector-moving devices intermediate between them and the pattern-surface, shown in Figs. 5, 7, 8 as composed of blocks $x^4$, which are connected with the fingers $a^5$, moved in one direction by the pins or protuberances of the pattern-surface $h'$, and the movement of the fingers and connected blocks in the other direction is effected by the weighted ends of the said fingers.

It will be noticed that the shafts of the pattern-surfaces for both the shedding and drop-box mechanism turn in unison; but as the devices which make the quick changes in the shuttle-box and shedding mechanism, to insure the proper weft and shed-crossings, must be operated at different periods of time, it follows that the pattern-surface of the shuttle-box mechanism, although moved when the shedding-pattern moves, must not actually at that time cause the operation of the shifting-levers. Consequently the shuttle-box-pattern surface is herein moved as the shedding-pattern surface is moved merely to bring into line that row of its protuberances which is to determine which shuttle is next to be shot, and after the shed is closed and the lay is substantially at its forward position the selectors have given to them, by their special cam on the cam or other driven shaft, their movement, which causes the shifting-levers to turn on their fulcra, and during such movement of the selectors the protuberances or row of pattern-indicators previously brought into position act while the pattern-surface is at rest to insure the placing of each selector of the series of selectors in the position demanded by the said protuberances.

As shown in the drawings, the pattern-surface $h'$, when turned, acts upon and turns the fingers and moves the blocks $x^4$, so that when the selectors are next raised one or the other of the toes 53 or 54 will strike the under surface of the said block, which will cause the selectors to be turned on their pivots 52, so that when the selectors are immediately after brought into contact with the ends 59 of the shifting-levers $b^5$ the said levers will be turned in accordance with the demands of that row of protuberances of the pattern-surface $h'$ which was brought into operative position and there left when the pattern-surface $b'$ was last moved.

As the selectors are moved upward their inclined or wedge-shaped points 55 are thrown to one or the other side of a vertical line let fall from pivot 52, so that as the selectors are depressed by the cam $s^4$, link $u^4$, and arm 49 the ends 55 enter between the faces 56 of the spring-jaws, pivoted at 57 and held together by a strong spring, 58, and acting upon one or the other of the reversely-inclined edges of the ends of the shifting-levers, also contained between the said jaws, turn the said levers in one or the other direction about their fulcra 60, and cause the toothed cranks $c^5$ carried by them (one on each lever) to be thrown into position to be engaged by the teeth of one or the other of the long gears $j^4$ or $k^4$, in contact with which they are held by the force of the said spring 58 while the said long gears rotate the said toothed cranks in one or the other direction, (see Figs. 7 and 8,) according to which of the said gears is operating.

For sake of brevity, those devices which come directly in contact with the protuberances of the pattern-surface $h'$ and cause the said selectors to turn on their fulcra are herein denominated as the intermediate connectors or devices between the selectors and shuttle-box-pattern surface.

The forward ends, 68, of the blocks $x^4$ are steadied and kept in straight course by the comb-like guide 69.

Each toothed crank $c^5$ (four being herein shown) is supported at its center by a pin, 61, on one of the levers $c^5$, and has a crank-pin, 62, which, by means of a connecting-rod, $d^5$, is connected with one of the prime or secondary shuttle-box levers, and consequently as the said toothed cranks are rotated in one or the other direction the said prime and secondary shuttle-box levers are moved either both in the same or in opposite directions, according to which one of the shuttle-boxes of the series it is desired to place opposite the raceway of the lay.

The lower end, 63, of the shifting-levers $b^5$ is steadied by moving in a guide, $e^5$. This guide is pivoted at 70 upon the frame $g^4$, is slotted, and receives a set-screw, 71, by which to confine the guide in proper position to regulate the extent of vibration of the lower ends of the shifting-levers $b^5$, and so also that it may be turned down out of range of the ends of the said levers to remove them from their center of motion and not lose its proper center or position when again turned up, as in Fig. 5.

Figs. 13 to 19, inclusive, show a series of diagrams representing side and front elevations of the shuttle-box levers for the two sets of shuttle-boxes at opposite ends of the lay, with their connected chains and sheaves, hereinbefore referred to as upon the secondary levers and stationary stud $m^3$. The said diagrams are marked to designate that box at the right and left hand sides of the loom which will be brought opposite the raceway of the lay when the said levers are in the positions therein designated.

In the diagrams Figs. 13 to 19, inclusive, the secondary shuttle-box lever $n^3$ is represented by the full lever-shaped outline, and the primary lever $s^3$, co-operating with it to move the tier of boxes at the right of the loom, by the full single straight line, while the secondary lever $b^4$ for the left-hand tier is represented by the lever-shaped dotted outline, and its co-operating primary lever $f^4$ by the single straight dotted line.

In operation, when the primary lever of either series of shuttle-boxes is down and the secondary lever up, box No. 2 will be operative. The reverse of this position will bring box No. 3; when both levers are down, box No. 4; and both up, box No. 1. The movement of the secondary lever alone drawing on the chain about its sheave will move the boxes two spaces.

The sheave on the stationary stud $m^3$ enables us to use shuttle-box levers having the same center of motion, thereby enabling all the lever cranks and connections to be of the same length and mutually interchangeable. Adjusting the sheaves on the shuttle-box levers, slots being made therein for that purpose, (see Fig. 5,) enables us to provide for exact adjustments, so as to bring the shuttle-box bottom and raceway in exactly the right planes when at rest.

The modification, Fig. 20, shows the selector prolonged by projection 80, with which engages a spring, 81, the tendency of which is to throw the lower end of the selector toward the pattern-surface $h'$, (shown as a chain;) and at the front side of the selector we have attached a stiff flat spring, 82, to act as the device intermediate between the selector and pattern-surface. The selector in this figure will be raised from between the spring-held jaws 56 and from contact with the end of the shifting-lever $b^5$, as in Figs. 7 and 8, and will be again thrown down therein in contact with the end of the shifting-lever while the pattern chain or surface is at rest.

When the shifter is elevated it will be turned back against the stress of the spring 81, provided a roll of the chain is in position to be struck by the flat spring 82; but if not acted upon by one of the said rolls the selector will descend in contact with the same edge of the shifting-lever with which it was in contact when just lifted.

Figure 10:
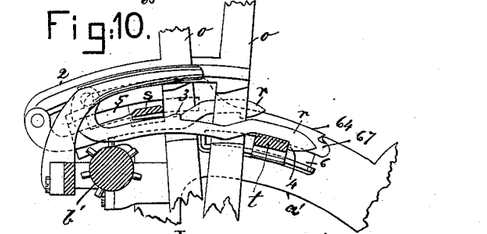
Fig. 10, a detail showing the upper ends of two upright heddle-levers and their notched jacks, the levers being broken off.
Figure 11:
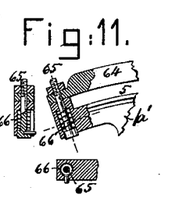
Fig. 11, a detail of part of the yielding curved guide, in which the elevator and depressor travel.

The upper part, 64, of the frame-work $a'$, containing the slots in which the elevator and depressor move, are connected at their outer ends by bolts 65, having springs 66; and the rear ends of the said parts 64 are so shaped and supported upon the frame $a'$, as shown at 67, Fig. 10, that the parts 64 may rise or move away from the part $a'$ and permit the elevator or depressor to pass the notches or hooks of the jacks $r$ in case the movement of the harness-levers and harness-frames becomes obstructed.

If the gear $n^4$ makes one revolution for each rotation of the crank-shaft, then the said gear need have but one blank space and flange, and the cam-groove $t^4$ will be shaped to give but one throw.

We are aware, in a loom for weaving straw matting, (the shed being open,) that the straw or straws for filling has been introduced in the open shed, and that the lay has then been brought forward to hold the said straw filling against the fell, and while so held the warps have been moved to form the shed, the warps being changed from bottom to top and from top to bottom, and after this the lay has been pushed back, and then other straw or straws for filling has been inserted between the warps and the filling again beaten up, as before.

In such loom and method of weaving it will be seen that the warps never move except when the filling is held by the reed, and consequently it becomes necessary to give to the harness-operating mechanism a quick movement—a movement so quick and in such time as would be very injurious in a practical loom for weaving the finer or better class of fabrics; and such quick abrupt movement could only be tolerated in looms for weaving fabrics wherein the warps are made of stout material and not highly "slayed."

We are also aware, in so-called "close-shed" looms, that the shed has been crossed over the filling last inserted as the reed in its forward motion arrived at a point distant about one to one and one-half inch from the fell, or, in other words, when the lay in its forward movement has traversed over about five-sixths of its chase. This method is also very injurious, and could not be practiced in a loom for weaving fine goods, such as it is desired to weave upon the loom the subject of our present application, for the filling so held by and between the crossed warps at such a distance in advance of the fell would be so raked or driven horizontally through between the crossed warps that the friction of the warps on the filling above and below would injure and oftentimes destroy fine filling and injure the fabric and the compactness of the weaving.

In open-shed looms as generally made the warps are not brought to a close, and necessarily to a crossing, until the lay strikes the fell, at which time the formation of the shed is commenced and the filling is inserted when the lay is in its most backward position, and the warps commence to close when the lay is being moved forward, and becomes fully closed only as the lay reaches the fell, when the same operation is again repeated.

In the so-called "open-shed" loom, immediately after the filling is inserted in the shed, the warp-threads which are to move from the upper into the lower plane, and vice versa, both moving in opposite directions, commence their movement when the lay comes forward, and the warps are about at a level or closed as the lay strikes the fell, a portion of the warp being at that time up and a portion down, and the crossing or moving warps arrive at their destination as the lay arrives half-way back, and then the shed is ready for and receives a new shed of filling.

In a close-shed loom all the warps are moved at every pick, while in the open-shed loom only a part of the warps is so moved.

The straw-matting loom referred to makes the shed in a quick and harsh manner while the lay remains at the fell, whereas in the usual and regular forms of close and open shed looms all the time of the loom is taken to move the warps except just at the time necessary for the insertion of the filling, thus gaining for the shedding all the time possible to enable the shed to be formed with the least strain.

In our invention the close-shed principle is adopted, and all the time which it is possible to take is taken for moving the warps. We also, having that necessity in view, have so timed the crossings and movements of the lay as to force in the filling and retain it against the cloth immediately after closing the warps and while the next shed is completed.

I claim—

1. In a loom, rotatable toothed gears $j^4$ $k^4$ and a series of toothed cranks and shifting-levers, upon which they are mounted, and connecting-rods and shuttle-box levers, and a tier of shuttle-boxes, and a chain or connecting device between the shuttle-boxes and shuttle-box levers, combined with pivoted selectors and a pattern-surface and intermediate devices to move the selectors into position to bear upon one or the other edge of the shifting-levers at their ends, and other mechanism adapted to move the selectors and cause them to turn the shifting-levers upon their fulcra, to enable the toothed cranks to be turned in one or the other direction and through their connecting-rods actuate the shuttle-box levers, substantially as described.

2. The shifting-lever having its edges at one end reversely inclined, as described, combined with a wedge-pointed selector, mechanism to reciprocate the same, and spring-held jaws to regulate the force or pressure of the selector upon the shifting-lever, substantially as described.

3. The intermittingly-rotatable long gears $j^4$ $k^4$ and toothed gears $l^4$ $m^4$, combined with the toothed gear provided with blank spaces and flanges, as described, mechanism to actuate the said gear, and the holder to act on the flanges to stop the long gears while the toothed and flanged gear rotates.

4. The combination, with the reciprocating wedge-pointed selector and its vibrating carrying-arm 49, of the connecting-link and adjustable cam $s^4$ and mechanism to rotate the said cam, substantially as described.

5. In a loom, two shifting-levers, $b^5$, and mechanism to move them according to the requirements of the pattern-surface, two toothed cranks and two connecting-rods, and a pair of reversely-rotatable gears to turn the toothed cranks, combined with a primary shuttle-box lever, a secondary shuttle-box lever and sheave thereon, a chain or connection, $f^3$, supported by sheaves and a shuttle-box rod, and a series of four shuttle-boxes, to operate substantially as described.

6. The frame-work provided with curved guiding slots or ways, as described, and the elevator and depressor, adapted to be reciprocated therein to engage the hooked jacks and by one of their edges to even the shed, combined with the hooked jacks, harness-frames, and cording, notched upright levers, with which the cording is connected, and with the rocker-shaft and mechanism to rock it, its arms $w$ $w^\times$, of unequal length, and connecting-links $u$ $v$, to move one of the ends of the lifter and depressor farther than their other ends when opening the shed, to enable the successive harness-frames at the rear of the front harness-frame to be lifted higher than the one next in front of it, and to insure accuracy of adjustment of each frame of the series of harness-frames, all substantially as described.

7. In combination, in a fancy-loom, pattern-surfaces rotatable together in unison for the shedding and drop-box mechanisms, shed-forming devices, shifting-levers, toothed cranks, connecting-rods, shuttle-box levers, intermittingly-rotatable gear to turn the toothed cranks, selectors to operate upon either of the edges of the ends of the shifting-levers, and intermediate mechanism between the shifters and protuberances of the stationary shuttle-box pattern-surface, and mechanism to reciprocate the selectors, turn them on their pivots according to the demand of the protuberances of the said pattern-surfaces, and bring them against and so as to turn the shifting-levers on their fulcra, the combination being and operating substantially as and for the purpose described.

8. The lay, the picker-staffs carried by it, the rocker-shafts 24, and connections between them and the auxiliary picking-levers pivoted on the rocker-shafts, combined with shaft $c^2$, its arms $g^{10}$ $h^2$, the lever $i^2$, and connecting-links between it and the auxiliary picking-levers, to suspend at the desired time, as described, the action of the picking mechanism, substantially as set forth.

9. The two shifting-levers $b^5$ of the first order, under control of a pattern-surface, two toothed cranks carried thereby, and mechanism to rotate them at the proper times, two connecting-rods, one for each toothed crank, and two shuttle-box levers having the same center of motion, a sheave on one of the said levers between its ends, two sheaves on a stationary and common center, $m^3$, and a chain connected at one end with one of the said levers and at its other end with a shuttle-box rod, the said chain being passed about the sheave on one of the said shuttle-box levers and about the two stationary sheaves on the said shed and pattern mechanism, and a tier of shuttle-boxes, as and for the purpose described.

10. The shifting-lever $f^5$, pivoted between its ends, and the toothed crank carried thereby, and rotatable gears to turn the toothed crank in one or the other direction, combined with mechanism to operate at the proper time upon one end of the shifting-lever at one or the other of its edges and move it positively when the toothed crank is thrown into engagement with either of its actuating-gears, all substantially as described.

11. The primary shuttle-box lever pivoted at one end, the secondary shuttle-box lever having the same center of motion, and its sheave $m^3$, and mechanism to operate the said levers, combined with the sheave $p^3$ on the fixed stud $m^3$ and the shuttle-box chain or connection $f^3$ and shuttle-box rod, the sheave $p^3$ supporting the said connection between the primary lever and the sheave of the secondary lever, substantially as described.

12. The combination, in a fancy-loom of the closed-shed order, of the following instrumentalities, viz: two connected rotating pattern mechanisms, one for the shed-forming and the other for the shuttle-box mechanism, and devices to actuate them in unison, harness-frames and mechanism to lift them as demanded by the pattern mechanism, a tier of shuttle-boxes, shuttle-box levers and means to connect them with the shuttle-boxes, long gears, and means to rotate them, toothed cranks operated by the said long gears, connecting-rods between the said toothed gear and shuttle-box levers, a series of shifting-levers and intermediate mechanism between the said shifting-levers, and the pattern mechanism for the shuttle-boxes, whereby the warps are shed and the shuttle-boxes are shifted at different orders of time, notwithstanding the pattern mechanism or contrivances for each of them are moved simultaneously, as set forth.

13. That improvement in the art of weaving which consists in inserting the filling in the open shed, striking the filling by the reed, and placing it at the fell in contact with the cloth at about the time the shed is closed, as described, and retaining the said filling in constant contact with the cloth by the reed, as set forth, while the succeeding shed is formed for the insertion of the next pick of filling, to thereby make a compact and solid fabric, such as herein described, and for the purpose set forth.

In testimony whereof we have signed our names to this specification in the presence of two subscribing witnesses.

GEO. CROMPTON.
   HORACE WYMAN.

Witnesses:
 J. A. WARE,
 G. W. GREGORY.